(12) United States Patent
Duvall et al.

(10) Patent No.: US 12,102,949 B2
(45) Date of Patent: Oct. 1, 2024

(54) FILTER MEDIA HAVING ANGLED EMBOSSMENTS

(71) Applicant: MANN+HUMMEL Filtration Technology US LLC, Gastonia, NC (US)

(72) Inventors: John Robert Duvall, Gastonia, NC (US); James Michael Glazewski, Gastonia, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 1326 days.

(21) Appl. No.: 16/444,153

(22) Filed: Jun. 18, 2019

(65) Prior Publication Data

US 2020/0398202 A1    Dec. 24, 2020

(51) Int. Cl.
*B01D 46/00*     (2022.01)
*B01D 46/10*     (2006.01)
*B01D 46/52*     (2006.01)

(52) U.S. Cl.
CPC ......... *B01D 46/0001* (2013.01); *B01D 46/10* (2013.01); *B01D 46/522* (2013.01); *B01D 2275/10* (2013.01)

(58) Field of Classification Search
CPC .................................................. B01D 46/525
See application file for complete search history.

(56) References Cited

U.S. PATENT DOCUMENTS

| | | | |
|---|---|---|---|
| 6,685,833 B2 * | 2/2004 | Lippold ................. | B01D 46/10 55/497 |
| 7,323,105 B1 * | 1/2008 | Janikowski .......... | B01D 46/523 210/493.4 |
| 2018/0214806 A1 * | 8/2018 | Tate ...................... | B01D 46/522 |
| 2019/0329170 A1 * | 10/2019 | Page ...................... | B01D 46/58 |

\* cited by examiner

*Primary Examiner* — Jonathan M Peo
(74) *Attorney, Agent, or Firm* — Honigman LLP

(57) ABSTRACT

A pleated filter media configured to receive a stream of fluid flowing in a first direction is provided. The pleated filter media includes a first filter media panel and a second filter media panel coupled to the first filter media panel at a first pleat extending in a second direction transverse to the first direction. The pleated filter media also includes a first embossment disposed on the first filter media panel and the second filter media panel. The first embossment extends in a third direction transverse to the first direction and the second direction.

21 Claims, 15 Drawing Sheets

FILTER MEDIA HAVING ANGLED EMBOSSMENTS

FIELD

The present disclosure relates generally to a filter media, and more particularly to a pleated filter media having angled embossments.

BACKGROUND

This section provides background information related to the present disclosure and is not necessarily prior art.

Many types of systems and assemblies utilize a filter element to ensure a clean flow of fluid into or out of the system or assembly. For example, internal combustion engines utilize an air filter element to ensure that the air flowing into the cylinders of the internal combustion engine are free of particulate matter prior to combustion. In this regard, known filter elements often use a filter media pack to filter particulate matter from a stream of fluid such as air, water, or fuel. Some filter media packs include a pleated filter media and utilize spacers to separate one layer of the pleated filter media from an adjacent layer of the pleated filter media and to direct the stream of fluid flowing through the filter element. Other filter media packs include a pleated filter media having embossments to separate one layer of the pleated filter media from an adjacent layer of the pleated filter media and to direct the stream of fluid flowing through the filter element. While known filter elements and known filter media packs have proven acceptable for their intended purposes, a continuous need for improvement in the pertinent art remains.

SUMMARY

This section provides a general summary of the disclosure, and is not a comprehensive disclosure of its full scope or all of its features.

One aspect of the disclosure provides a pleated filter media configured to receive a stream of fluid flowing in a first direction. The pleated filter media includes a first filter media panel and a second filter media panel coupled to the first filter media panel at a first pleat extending in a second direction transverse to the first direction. The pleated filter media also includes a first embossment disposed on the first filter media panel and the second filter media panel. The first embossment extends in a third direction transverse to the first direction and the second direction.

Implementations of this aspect of the disclosure may include one or more of the following optional features. In some implementations, the first embossment is disposed at a first angle relative to the second direction. The first angle may be greater than zero degrees and less than ninety degrees. The first angle may be substantially equal to forty-five degrees.

In some implementations, the pleated media filter includes a second embossment disposed on at least one of the first filter media panel or the second filter media panel. The second embossment may be disposed at a second angle relative to the second direction. The second angle may be different than the first angle. Optionally, the second embossment may be disposed on the first filter media panel and the second filter media panel. Additionally or alternatively, a second embossment may be disposed on at least one of the first filter media panel or the second filter media panel at a second angle relative to the second direction, where the first embossment terminates at a first axis and the second embossment is offset from the first embossment and terminates at the first axis. Here, the second angle may be equal to the first angle.

In some examples, the first panel includes a first clean side and a first dirty side opposite the first dirty side, and the second panel includes a second clean side and a second dirty side opposite the second clean side. In this example, the second dirty side faces the first dirty side and the first embossment defines a first protruding portion on the first clean side and a second protruding portion on the second clean side. Here, the first protruding portion may be parallel to the second protruding portion. The first embossment may define a first recessed portion on the first dirty side and a second recessed portion on the second dirty side, the first recessed portion aligned with the second recessed portion.

In some configurations, the first panel includes a first clean side and a first dirty side opposite the first dirty side, and the second panel includes a second clean side and a second dirty side opposite the second clean side. In this configuration, the second dirty side faces the first dirty side and the first embossment defines a first protruding portion on the first dirty side and a second protruding portion on the second dirty side. Here, the first protruding portion may engage the second protruding portion. The first protruding portion may be parallel to the second protruding portion.

Another aspect of the disclosure provides a pleated filter media configured to receive a stream of fluid flowing in a first direction. The pleated filter media includes a first filter media panel including a first embossment. The pleated filter media also includes a second media panel coupled to the first media panel at a first pleat. The second media panel includes a second embossment aligned with the first embossment and extending from the first pleat.

This aspect may include one or more of the following optional features. In some implementations, the first embossment is disposed on the first filter media panel and the second filter media panel. The first pleat may extend in a second direction, where the first embossment is disposed at a first angle relative to the second direction and the second embossment is disposed at a second angle relative to the second direction, the first and second angles each being greater than zero degrees and less than ninety degrees. Here, the first angle may equal the second angle. A third embossment may be disposed on at least one of the first filter media panel or the second filter media panel, where the third embossment is disposed at a third angle relative to the second direction, the third angle being different than the first angle. Additionally or alternatively, a third embossment may be disposed on at least one of the first filter media panel or the second filter media panel at a third angle relative to the second direction, where the first embossment terminates at a first axis and the second embossment is offset from the first embossment and terminates at the first axis. Here, the third angle may be equal to the first angle.

In some examples, the first panel includes a first clean side and a first dirty side opposite the first dirty side, and the second panel includes a second clean side and a second dirty side opposite the second clean side. In this example, the second dirty side faces the first dirty side and the first embossment defines a first protruding portion on the first dirty side and a second protruding portion on the second dirty side. The first protruding portion may engage the second protruding portion. The first protruding portion may be parallel to the second protruding portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1A:
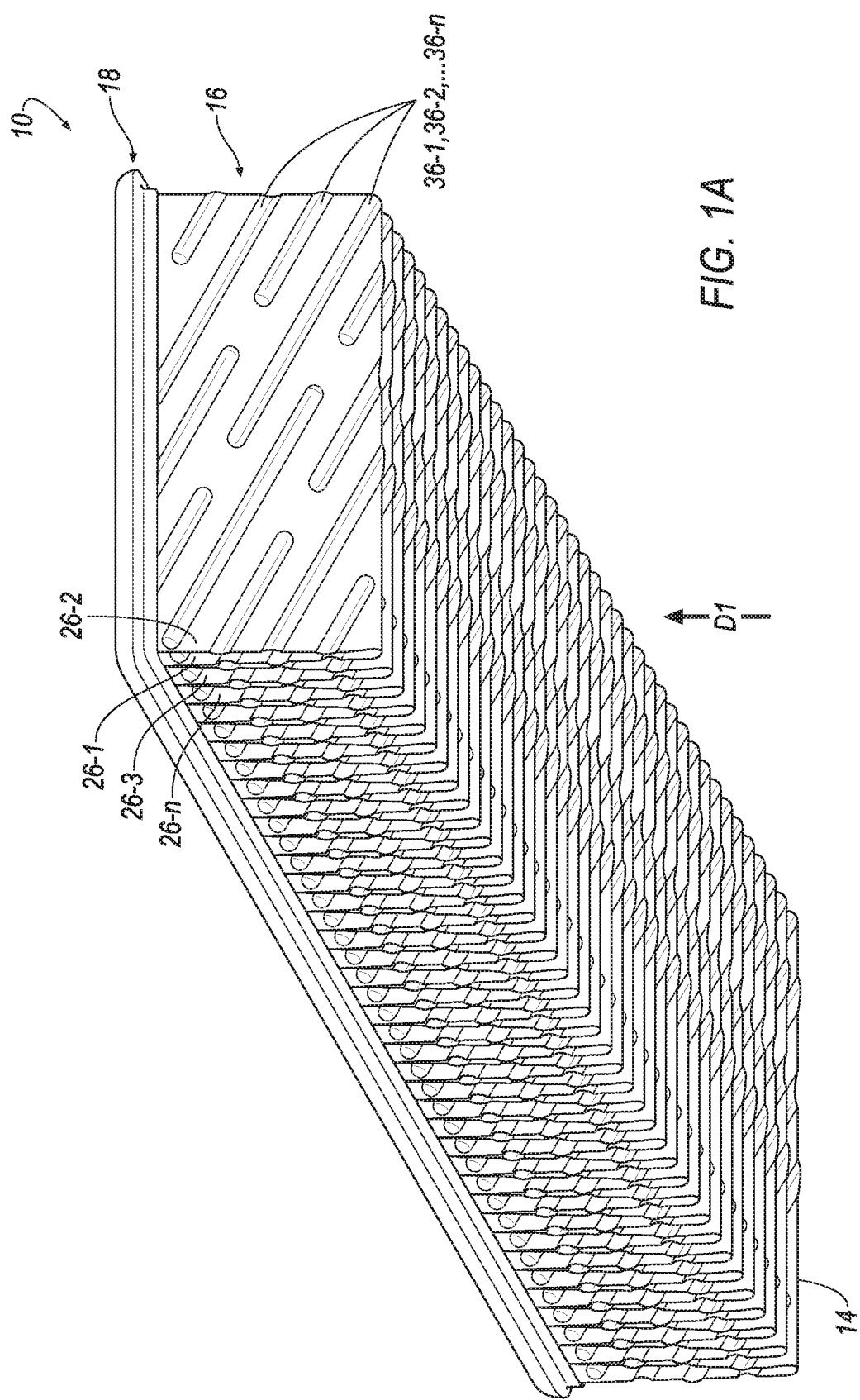
FIG. 1A is a bottom perspective view of a filter element in accordance with the principles of the present disclosure.
Figure 1B:
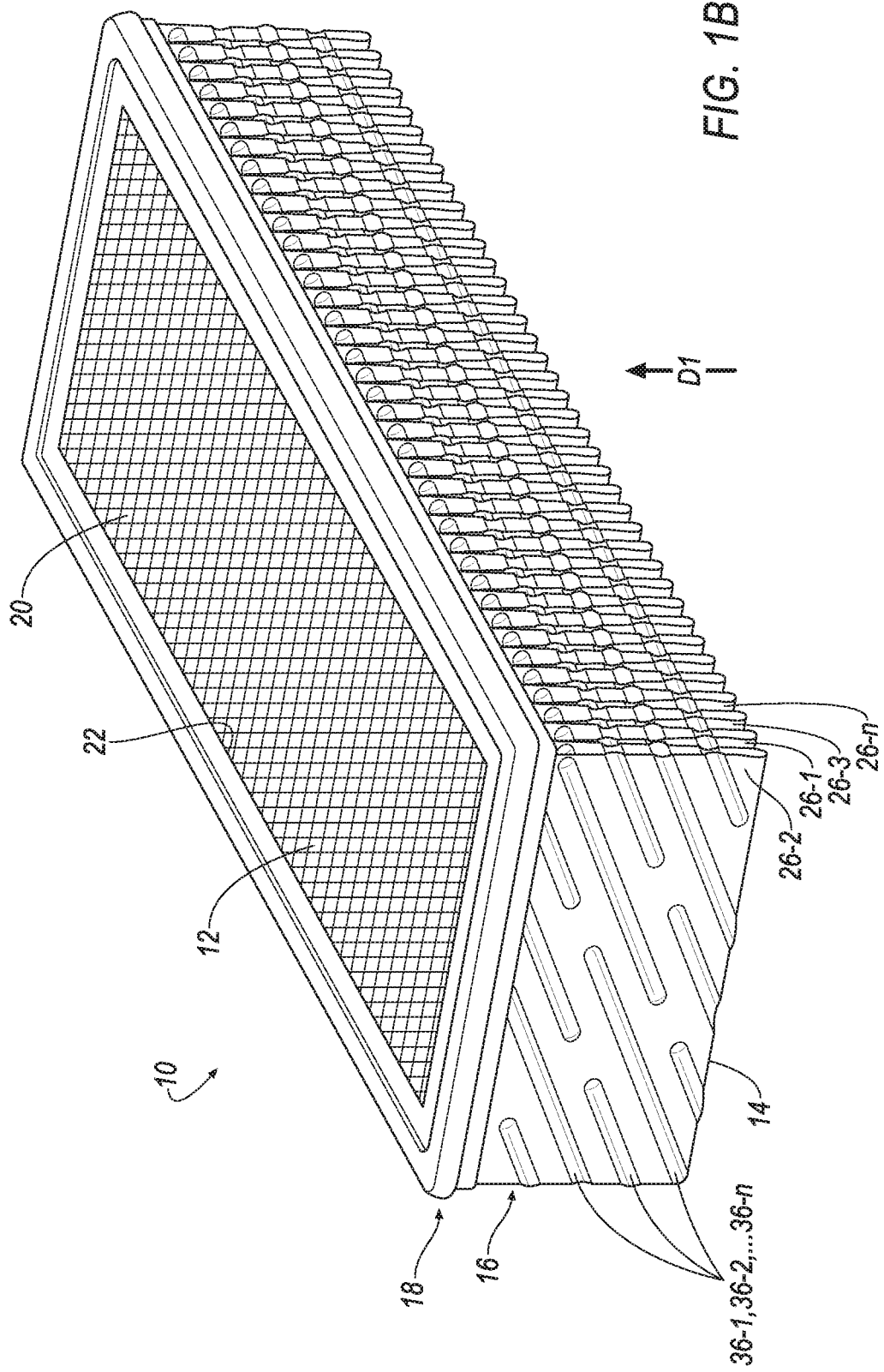
FIG. 1B is a top perspective view of the filter element of FIG. 1A.
Figure 2:
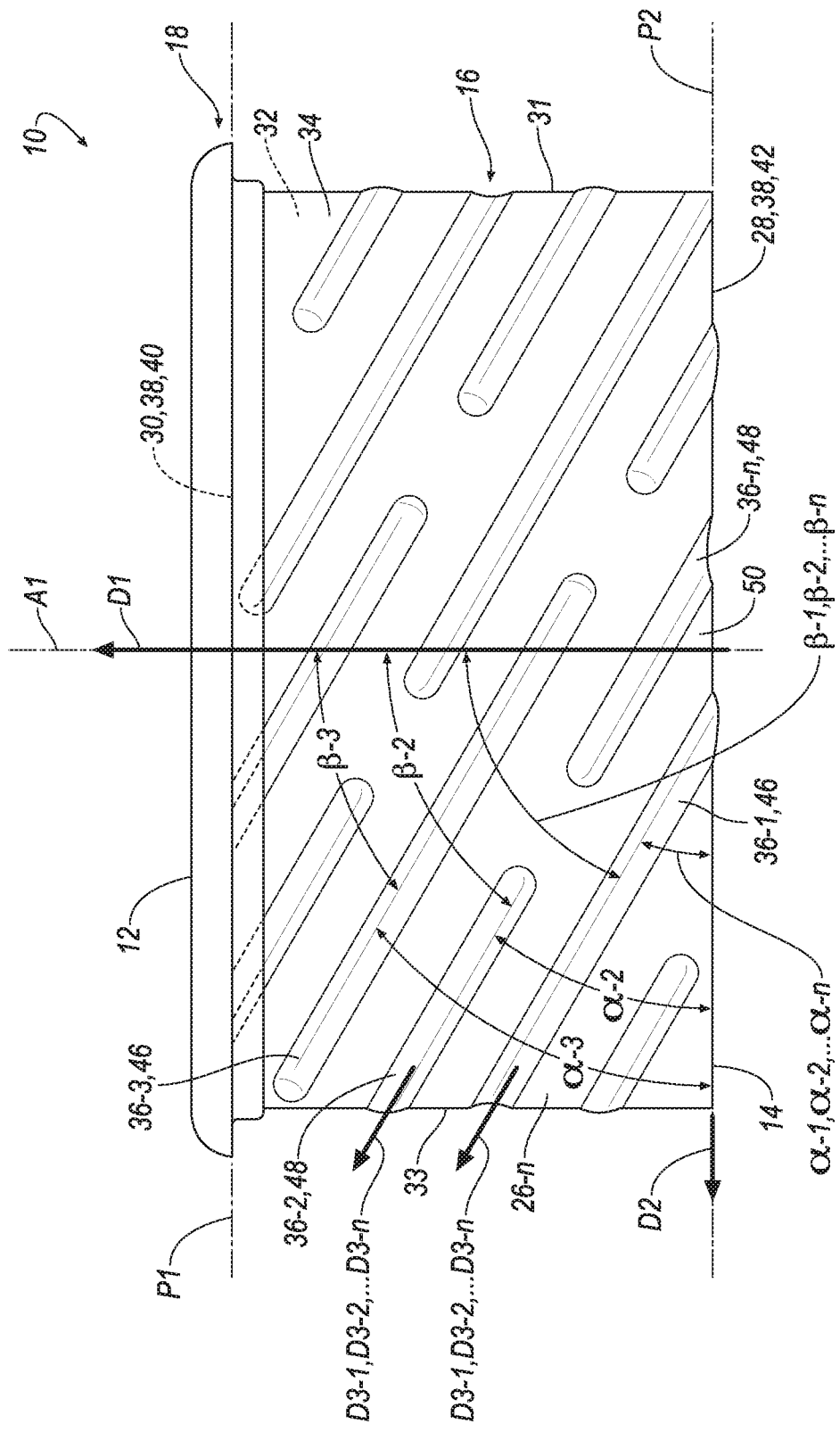
FIG. 2 is an end view of the filter element of FIG. 1A, showing a first panel of filter media.

Referring to FIGS. 1A-2, a filter element 10 is illustrated. As will be described in more detail below, in use, the filter element 10 may receive a stream of fluid (e.g., air) flowing in a first direction D1 in order to remove particulate matter from the stream of fluid. In this regard, the filter element 10 may include a side 12 through which the flow of fluid exits the filter element 10, and a side 14 through which the flow of fluid enters the filter element 10. In this regard, the side 12 may be a clean side, and the side 14 may be a dirty side. In other implementations, the filter element 10 may receive the stream of fluid flowing in a direction opposite the first direction D1, such that the side 14 is the clean side through which the flow of fluid exits the filter element 10, and the side 12 is the dirty side through which the flow of fluid enters the filter element 10.

The filter element 10 may include a pleated filter media 16, a peripheral frame 18, and a screen 20 (FIG. 1B). The peripheral frame 18 may be made of a rubber or rubber-like polymer material such as polyurethane, for example, and may define, or be disposed about, an opening 22 (FIG. 1B). Upon installation in a housing (not shown), the frame 18 may sealingly engage the housing in order to control the flow of fluid through the housing. The screen 20 may be supported by the peripheral frame 18 such that the screen covers the clean side 12 of the filter element 10. For example, the screen may be disposed within the opening 22.

Figure 3A:
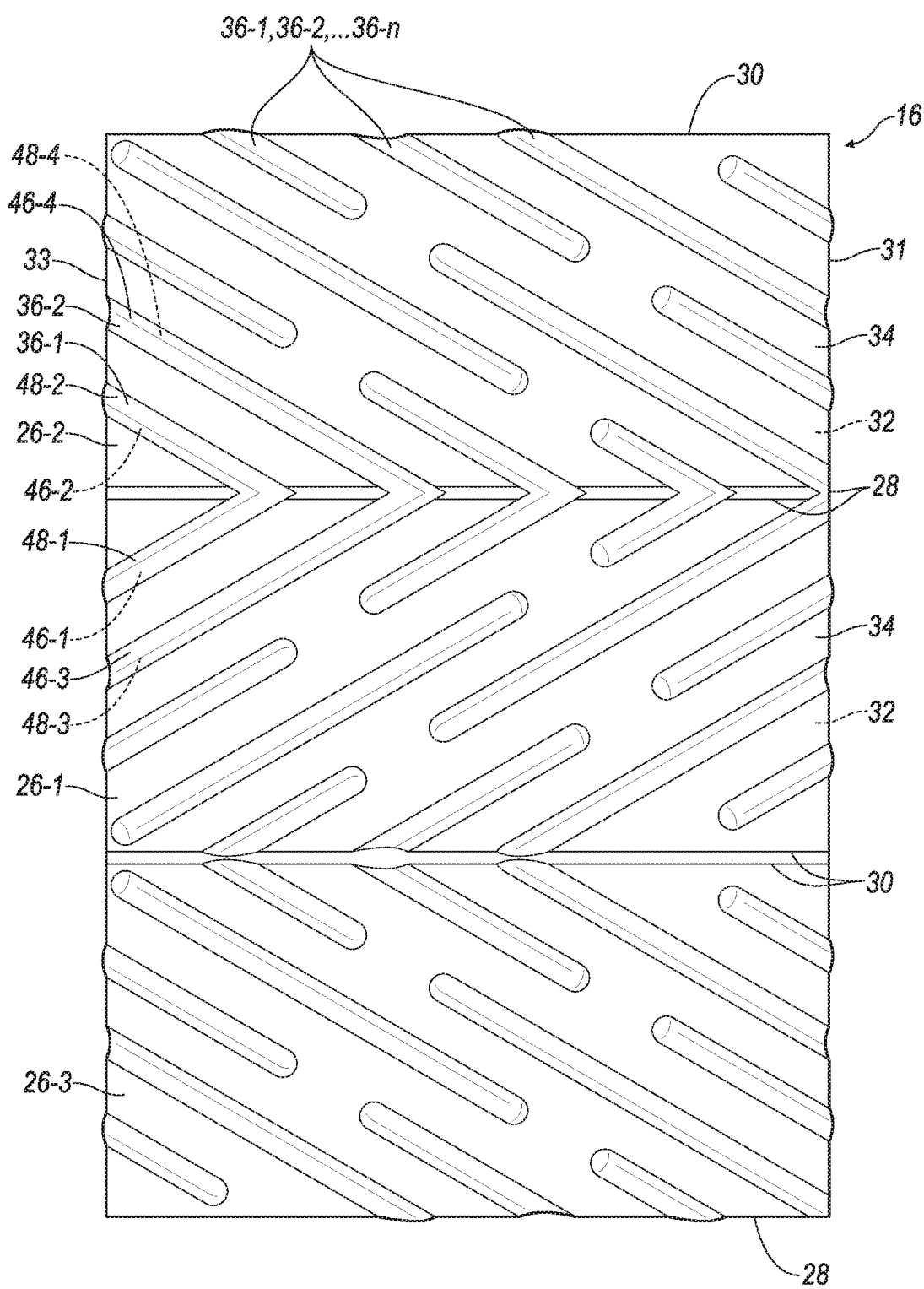
FIG. 3A is a plan view of a filter media of the filter element of FIG. 1A, showing a first side of the filter media prior to being pleated.
Figure 3B:
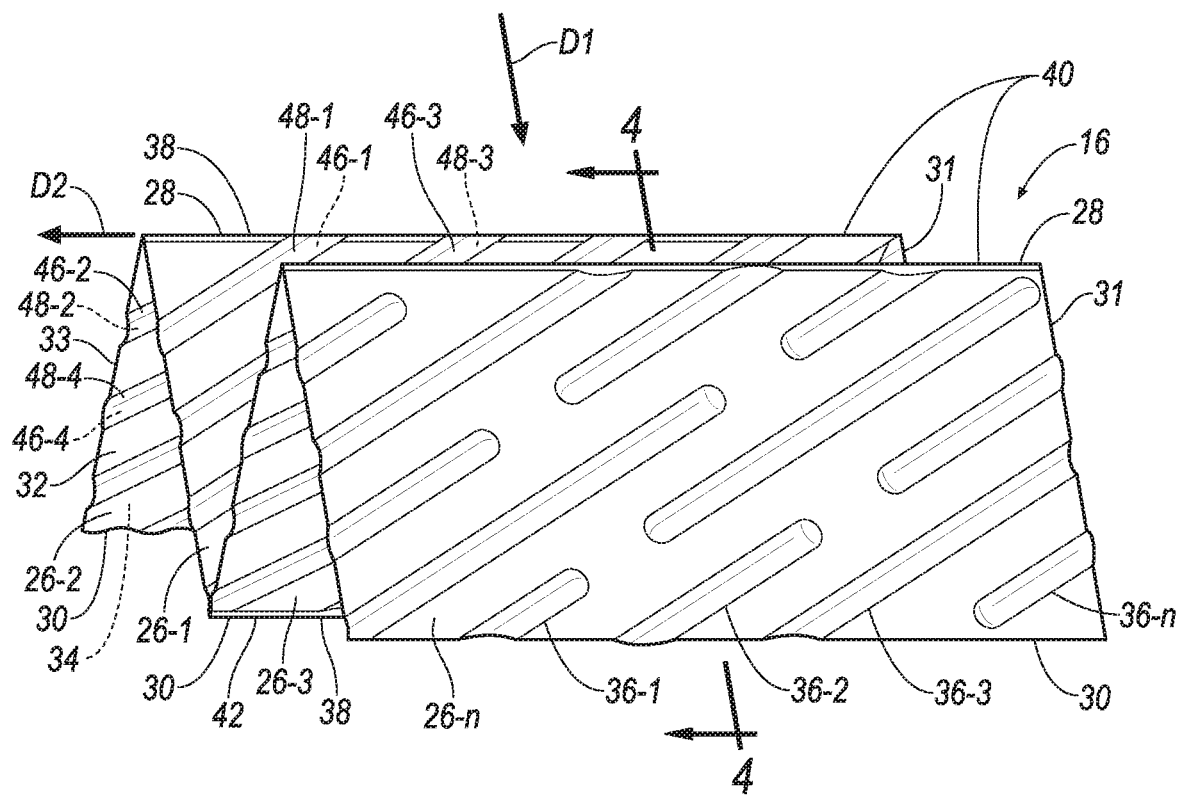
FIG. 3B is a perspective view of the filter media of FIG. 3A, showing the first side of the filter media after being pleated.

The pleated filter media 16 may include a plurality of filter media panels 26-1, 26-2, . . . 26-n. As illustrated in FIGS. 3A and 3B, each filter media panel 26-n may include an inlet edge 28, an outlet edge 30, a first lateral edge 31, a second lateral edge 33, a clean side 32, a dirty side 34, a plurality of embossments 36-1, 36-2, . . . 36-n, and a central axis A1. The outlet edge 30 may be opposite and parallel to the inlet edge 28. The first and second lateral edges 31, 33 may extend between the inlet edge 28 and the outlet edge 30. The clean side 32 may extend between the inlet edge 28 and the outlet edge 30. The dirty side 34 may be opposite the clean side 32 and extend between the inlet edge 28 and the outlet edge 30. The central axis A1 may extend in a direction substantially parallel to the flow direction D1 and be disposed in a center of the filter media panel 26-n. While the pleated filter media 16 is generally illustrated as being formed into a cuboid-shape, the pleated filter media 16 may be formed into other shapes (e.g., a cylinder) within the scope of the present disclosure, such that the inlet edges 28 and outlet edges 30 of the plurality of filter media panels 26-1, 26-2, . . . 26-n collectively define other shapes (e.g., coaxial cylinders).

Each filter media panel 26-n may be coupled to an adjacent filter media panel 26-n at the inlet edge 28 or the outlet edge 30. For example, the inlet edge 28 of a first filter media panel 26-1 may be coupled to the inlet edge 28 of a second filter media panel 26-2, while the outlet edge 30 of the first filter media panel 26-1 may be coupled to the outlet edge 30 of a third filter media panel 26-3. As illustrated in FIG. 3B, in some implementations, the filter media panels 26-1, 26-2, . . . 26-n are formed from a folded, unitary sheet of filter media, such that filter media 16 includes a plurality of pleats 38 aligned with the inlet edges 28 or the outlet edges 30. Accordingly, each filter media panel 26-n may be coupled to an adjacent filter media panel 26-n at one of the pleats 38.

As illustrated in FIG. 3B, the pleats 38 or the inlet and outlet edges 28, 30 may define a plurality of peaks 40 and valleys 42. The pleats 38 or the inlet and outlet edges 28, 30 may extend in a second direction D2 that is transverse (e.g., orthogonal) to the first direction D1. Accordingly, as illustrated in FIG. 2, the peaks 40 may define, or otherwise be disposed in, a first plane P1 proximate the clean side 12 of the filter element 10, while the valleys 42 may define, or otherwise be disposed in, a second plane P2 proximate the dirty side 14 of the filter element 10. In some implementations, the first plane P1 is parallel to the second plane P2. Accordingly, the direction D1 of the flow of fluid (e.g., air)

through the filter media 16 may be transverse (e.g., orthogonal) to the first or second planes P1, P2.

As illustrated in FIG. 2, the embossments 36-*n* may be formed in the filter media 16 such that each embossment 36-*n* defines (i) a protrusion 46 on one of the clean side 32 or the dirty side 34, and (ii) a channel 48 on the other of the clean side 32 or the dirty side 34. Each embossment 36-*n* may be spaced from an adjacent embossment 36-*n* by a substantially planar portion of the filter media 16 defining a plurality of gaps 50 between the embossments 36-*n*.

The embossments 36-*n* (e.g., the protrusions 46 or the channels 48) may extend between the inlet edge 28 and the outlet edge 30 in one or more directions D3-1, D3-2, . . . D3-*n*, such that each embossment 36-1, 36-2, . . . 36-*n* (e.g., each of the directions D3-1, D3-2, . . . D3-*n*) defines (i) a first angle α-1, α-2, . . . α-n relative to the inlet edges 28, the outlet edges 30, the peaks 40, or the valleys 42 (e.g., relative to the direction D2 or the first or second planes P1, P2) and (ii) a second angle β-1, β-2, . . . β-n relative to the direction D1 of the flow of fluid. For example, a first embossment 36-1 may be disposed at a first angle α-1 and a second angle β-1, a second embossment 36-2 may be disposed at a first angle α-2 and a second angle β-2, and a third embossment 36-3 may be disposed at a first angle α-3 and a second angle β-3. In some implementations, each first angle α-n is substantially equal (+/− three degrees) to one or more of the other first angles α-n, and each second angle β-n is substantially equal to one or more of the other second angles β-n. In this regard, each embossment 36-*n* may be substantially parallel (+/− three degrees) to one or more of the other embossments 36-*n*. In some implementations, each embossment 36-*n* is parallel to a plurality (e.g., all) of the other embossments 36-*n*. The first angles α-n and the second angles β-n may be greater than zero degrees and less than ninety degrees. In some implementations, the first angles α-n and the second angles β-n are each substantially (+/− three degrees) equal to forty-five degrees. In this regard, the directions D3-*n* may extend toward the outlet edge 30 or the second lateral edge 33 from the first lateral edge 31 or the inlet edge 28. While the embossments 36-1, 36-2, . . . 36-*n* are generally illustrated as extending from one of the first lateral edge 31 or the second lateral edge 33, it will be appreciated that the embossments 36-1, 36-2, . . . 36-*n* may be spaced apart from both the first and second lateral edges 31, 33 within the scope of the present disclosure. In this regard, the first and second lateral edges 31, 33 of a first filter media panel 26-1 may be sealingly coupled to the first and/or second lateral edges 31, 33, respectively, of a second filter media panel 26-2 by an adhesive or other suitable fastening technique, in order to prevent the flow of fluid between the first lateral edges 31 of the first and second filter media panels 26-1, 26-2 and between the second lateral edges 33 of the first and second filter media panels 26-1, 26-2.

Figure 4:
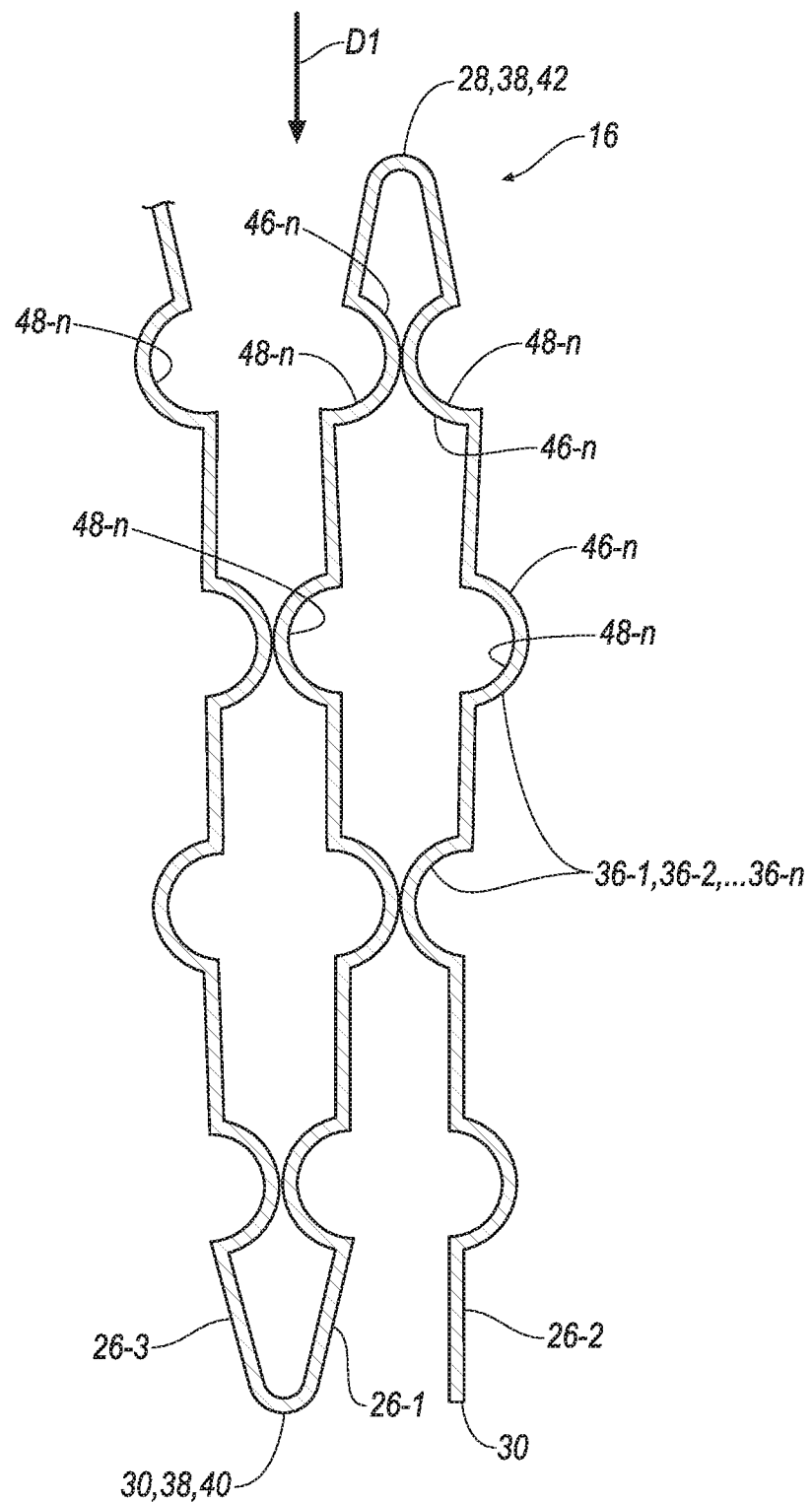
FIG. 4 is a cross-sectional view of the filter media of FIG. 3B taken through the line 4-4.

As illustrated in FIG. 4, in some implementations, at least one of the embossments 36-*n* may be disposed on a plurality of the media panels 26-*n*, such that each embossment 36-*n* defines a protruding portion 46-*n* having a convex surface, and a channel portion 48-*n* having a concave surface. For example, as illustrated in FIG. 3A, first and second embossments 36-1, 36-2 may each be disposed on both the first filter media panel 26-1 and the second filter media panel 26-2. Accordingly, the first embossment 36-1 may define a first protruding portion 46-1 on the clean side 32 of the first media panel 26-1, a first channel portion 48-1 on the dirty side 34 of the first media panel 26-1, a second protruding portion 46-2 on the clean side 32 of the second media panel 26-2, and a second channel portion 48-2 on the dirty side 34 of the first media panel 26-1. Similarly, the second embossment 36-2 may define a third protruding portion 46-3 on the dirty side 34 of the first media panel 26-1, a third channel portion 48-3 on the clean side 32 of the first media panel 26-1, a fourth protruding portion 46-4 on the dirty side 34 of the second media panel 26-2, and a fourth channel portion 48-4 on the clean side 32 of the second media panel 26-2.

In the pleated configuration (FIG. 3B), the first, second, third, and fourth protruding portions 46-1, 46-2, 46-3, 46-4 and the first, second, third, and fourth channel portions 48-1, 48-2, 48-3, 48-4 may each extend from the same pleat 38. In some implementations, the pleat 38 intersects the first and second embossments 36-1, 36-2 such that, in the pleated configuration, the first protruding portion 46-1 and the first channel portion 48-1 are aligned with, or substantially parallel to, the second protruding portion 46-2 and the second channel portion 48-2, respectively, and the third protruding portion 46-3 and the third channel portion 48-3 are aligned with, or substantially parallel to, the fourth protruding portion 46-4 and the fourth channel portion 48-4, respectively. As illustrated in FIG. 4, one or more protruding portions 46-*n* (e.g., a convex surface) on a first media panel 26-1 may engage another protruding portion 46-*n* (e.g., a convex surface) on a second media panel 26-2. In some implementations, a first of the protruding portions 46-*n* engages a second of the protruding portions 46-*n* along an entire length of the first or second protruding portions 46-*n*. Similarly, one or more channel portions 48-*n* (e.g., a concave surface) on a first media panel 26-1 may face another channel portion 48-*n* (e.g., a concave surface) on a second media panel 26-2. In some implementations, a first of the channel portions 48-*n* faces a second of the channel portions 48-*n* along an entire length of the first or second channel portions 48-*n*. While the protruding portions 46-*n* and channel portions 48-*n* are illustrated as having a generally semi-cylindrical cross-sectional shape extending along the length of the protruding portions 46-*n* and channel portions 48-*n*, respectively, the protruding portions 46-*n* and channel portions 48-*n* may define portions (e.g., half) of other cross-sectional shapes (e.g., square, rectangular, oval, oblong, stadium, etc.) within the scope of the present disclosure.

With reference to FIG. 2, during use of the filter element 10, fluid may flow in the direction D1 through the second plane P2 adjacent the dirty side 14 of the filter element 10. As the fluid strikes the embossments 36-*n* (e.g., the protrusions 46), the embossments 36-*n* may redirect the flow of fluid in one of the directions D3-1, D3-2, . . . D3-*n* and through and along the channels 48 and the gaps 50 between the embossments 36-*n*. In this regard, the embossments 36-*n* may direct the flow of fluid toward the first lateral edge 31 or the second lateral edge 33 and toward the first plane P1 adjacent the clean side 12 of the filter element 10, allowing dust and other particulate matter to be collected proximate the first and second lateral edges 31, 33.

The embossments 36-*n* extending from, or intersected by, the pleats 38 can increase a distance (as measured in a direction extending substantially parallel to the first or second planes P1, P2) between (i) the clean sides 32 of adjacent media panels 26-*n* and (ii) the dirty sides 34 of adjacent media panels 26-*n*, thus improving the flow of fluid along the gaps 50 between the adjacent clean sides 32 and dirty sides 34 of adjacent media panels 26-*n*.

Figure 5:
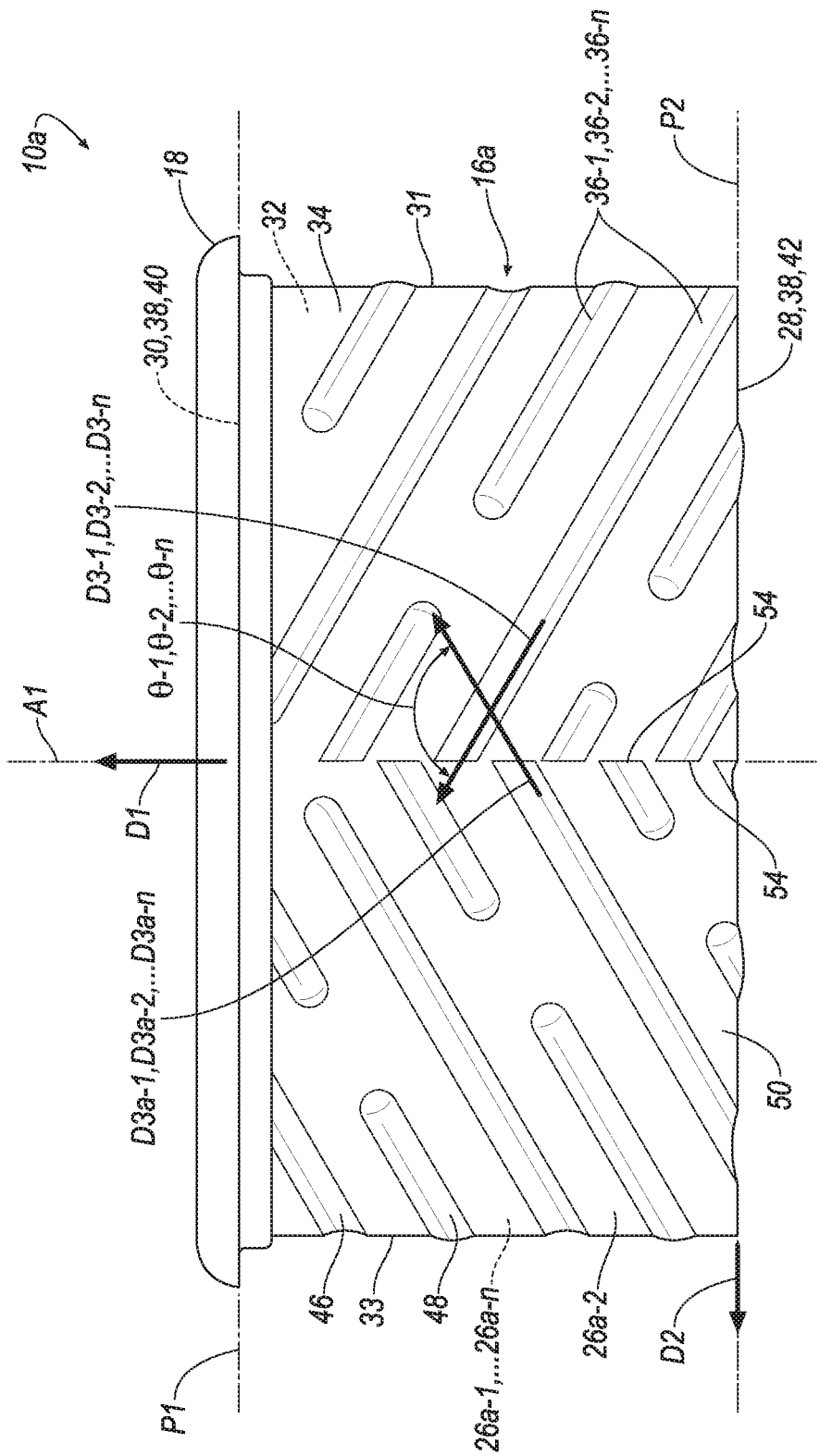
FIG. 5 is an end view of another filter element in accordance with the principles of the present disclosure.

With reference to FIG. 5, another filter element 10*a* is shown. The structure and function of the filter element 10*a* may be substantially similar to that of the filter element 10, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The filter element 10a may include a pleated filter media 16a, the peripheral frame 18, and the screen 20 (not shown). The pleated filter media 16a may include a plurality of filter media panels 26a-1, 26a-2, . . . 26a-n. As with filter media panels 26-n illustrated in FIGS. 3A and 3B, each filter media panel 26a-n may include the inlet edge 28, the outlet edge 30, the first lateral edge 31, the second lateral edge 33, the clean side 32, the dirty side 34, and the plurality of embossments 36-1, 36-2, . . . 36-n.

As illustrated in FIG. 5, one or more of the embossments 36-1, 36-2, . . . 36-n (e.g., the protrusions 46 or the channels 48) may extend between the inlet edge 28 and the outlet edge 30 in one or more directions D3a-1, D3a-2, . . . D3a-n. One or more of the directions D3a-1, D3a-2, . . . D3a-n may be transverse to one or more of the directions D3-1, D3-2, . . . D3-n, such that one or more of the embossments 36-1, 36-2, . . . 36-n (e.g., one or more of the directions D3a-1, D3a-2, . . . D3a-n) defines an angle θ-1, θ-2, . . . θ-n relative to one or more of the other embossments 36-1, 36-2, . . . 36-n (e.g., one or more of the directions D3-1, D3-2, . . . D3-n).

The angle θ-1, θ-2, . . . θ-n may be greater than zero degrees and less than one hundred eighty degrees. In some implementations, the angle θ-1, θ-2, . . . θ-n is substantially (+/− three degrees) equal to one hundred fifteen degrees. In this regard, the directions D3a-1, D3a-2, . . . D3a-n may extend toward the outlet edge 30 or the central axis A1 from the inlet edge 28 or the second lateral edge 33, while the directions D3-1, D3-2, . . . D3-n may extend toward the outlet edge 30 or the central axis A1 from the first lateral edge 31 or the inlet edge 28. In particular, one or more of the embossments 36-1, 36-2, . . . 36-n may extend between the inlet edge 28, the outlet edge 30, the first lateral edge 31, and a central axis A1 of each filter media panel 26a-n, while another one or more of the embossments 36-1, 36-2, . . . 36-n may extend between the inlet edge 28, the outlet edge 30, the second lateral edge 33, and the central axis A1 of each filter media panel 26a-n, such that one or more of the embossments 36-1, 36-2, . . . 36-n includes an end 54 disposed along (e.g., aligned with or adjacent to) the central axis A1.

In some implementations, the end 54 of one or more of the embossments 36-1, 36-2, . . . 36-n extending between the inlet edge 28, the outlet edge 30, the first lateral edge 31, and the central axis A1 terminates at, or extends from a portion of the gap 50 extending between the inlet edge 28, the outlet edge 30, the second lateral edge 33, and the central axis A1, while the end 54 of one or more of the embossments 36-1, 36-2, . . . 36-n extending between the inlet edge 28, the outlet edge 30, the second lateral edge 33, and the central axis A1 terminates at, or extends from another portion of the gap 50 extending between the inlet edge 28, the outlet edge 30, the first lateral edge 31, and the central axis A1. In particular each end 54 may be offset from the remaining ends 54 along the axis A1 (e.g., in the direction D1).

During use of the filter element 10a, fluid may flow in the direction D1, or the direction opposite D1) through the second plane P2 adjacent the dirty side 14 of the filter element 10a. As the fluid strikes the embossments 36-1, 36-2, . . . 36-n (e.g., the protrusions 46), the embossments 36-1, 36-2, . . . 36-n may redirect the flow of fluid in one of the directions D3-1, D3-2, . . . D3-n and D3a-1, D3a-2, . . . D3a-n and through and along the gaps 50 between the embossments 36-1, 36-2, . . . 36-n. In this regard, the embossments 36-1, 36-2, . . . 36-n may direct the flow of fluid toward the central axis A1 and toward the first plane P1 adjacent the clean side 12 of the filter element 10a, allowing dust and other particulate matter to be collected proximate the central axis A1.

Figure 6:
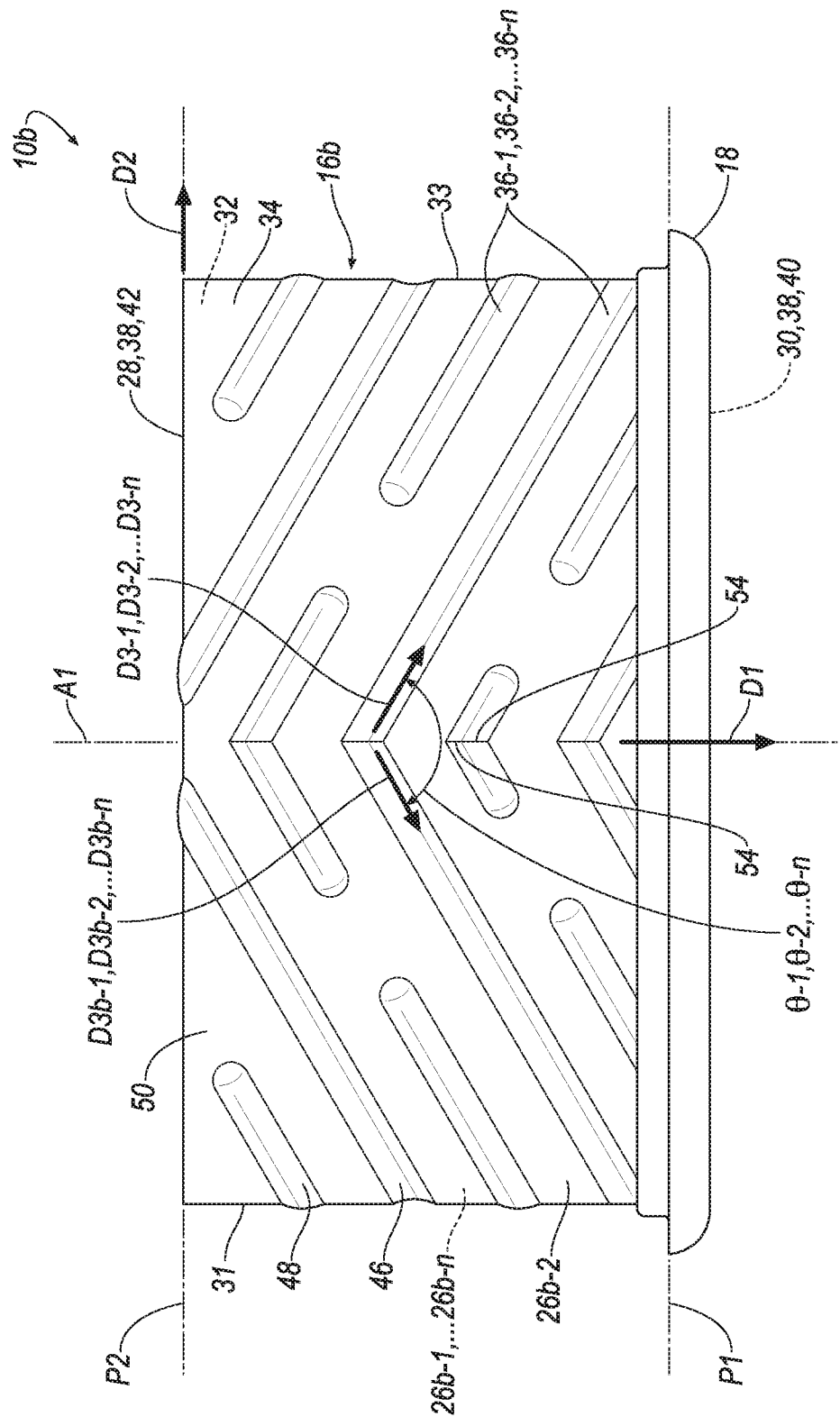
FIG. 6 is an end view of another filter element in accordance with the principles of the present disclosure.

With reference to FIG. 6, another filter element 10b is shown. The structure and function of the filter element 10b may be substantially similar to that of the filter elements 10, 10a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The filter element 10b may include a pleated filter media 16b, the peripheral frame 18, and the screen 20 (not shown). The pleated filter media 16b may include a plurality of filter media panels 26b-1, 26b-2, . . . 26b-n. As with filter media panels 26-n illustrated in FIGS. 3A and 3B, each filter media panel 26a-n may include the inlet edge 28, the outlet edge 30, the first lateral edge 31, the second lateral edge 33, the clean side 32, the dirty side 34, and the plurality of embossments 36-1, 36-2, . . . 36-n.

As illustrated in FIG. 6, one or more of the embossments 36-1, 36-2, . . . 36-n (e.g., the protrusions 46 or the channels 48) may extend between the inlet edge 28 and the outlet edge 30 in one or more directions D3b-1, D3b-2, . . . D3b-n. One or more of the directions D3b-1, D3b-2, . . . D3b-n may be transverse to one or more of the directions D3-1, D3-2, . . . D3-n, such that one or more of the embossments 36-1, 36-2, . . . 36-n (e.g., one or more of the directions D3b-1, D3b-2, . . . D3b-n) defines an angle θb-1, θb-2, . . . θb-n relative to one or more of the other embossments 36-1, 36-2, . . . 36-n (e.g., one or more of the directions D3-1, D3-2, . . . D3-n).

The angle θb-1, θb-2, . . . θb-n may be greater than zero degrees and less than one hundred eighty degrees. In some implementations, the angle θb-1, θb-2, . . . θb-n is substantially (+/− three degrees) equal to one hundred fifteen degrees. In this regard, the directions D3b-1, D3b-2, . . . D3b-n may extend toward the outlet edge 30 or the first lateral edge 31 from the central axis A1 or the inlet edge 28, while the directions D3-1, D3-2, . . . D3-n may extend toward the outlet edge 30 or the second lateral edge 33 from the central axis A1 or the inlet edge 28. In particular, one or more of the embossments 36-1, 36-2, . . . 36-n may extend between the inlet edge 28, the outlet edge 30, the first lateral edge 31, and a central axis A1 of each filter media panel 26a-n, while another one or more of the embossments 36-1, 36-2, . . . 36-n may extend between the inlet edge 28, the outlet edge 30, the second lateral edge 33, and the central axis A1 of each filter media panel 26a-n, such that one or more of the embossments 36-1, 36-2, . . . 36-n includes the end 54 disposed along (e.g., aligned with or adjacent to) the central axis A1.

In some implementations, the end 54 of one or more of the embossments 36-1, 36-2, . . . 36-n extending between the inlet edge 28, the outlet edge 30, the first lateral edge 31, and the central axis A1 terminates at, or extends from, the end 54 another one or more of the embossments 36-1, 36-2, . . . 36-n extending between the inlet edge 28, the outlet edge 30, the second lateral edge 33, and the central axis A1. Similarly, the end 54 of one or more of the embossments 36-1, 36-2, . . . 36-n extending between the inlet edge 28, the outlet edge 30, the second lateral edge 33, and the central axis A1 may terminate at, or extend from, the end 54 of one or more of the embossments 36-1, 36-2, . . . 36-n extending between the inlet edge 28, the outlet edge 30, the first lateral edge 31, and the central axis A1. In particular, each end 54 may be aligned with another end 54 along the axis A1.

During use of the filter element 10b, fluid may flow in the direction D1, or the direction opposite D1, through the second plane P2 adjacent the dirty side 14 of the filter element 10b. As the fluid strikes the embossments 36-1, 36-2, . . . 36-n (e.g., the protrusions 46), the embossments 36-1, 36-2, . . . 36-n may redirect the flow of fluid in one of the directions D3-1, D3-2, . . . D3-n and D3b-1, D3b-2, . . . D3b-n and through and along the gaps 50 between the embossments 36-1, 36-2, . . . 36-n. In this regard, the embossments 36-1, 36-2, . . . 36-n may direct the flow of fluid toward the first and second lateral edges 31, 33 and toward the first plane P1 adjacent the clean side 12 of the filter element 10b, allowing dust and other particulate matter to be collected proximate the second lateral edges 31, 33.

Figure 7:
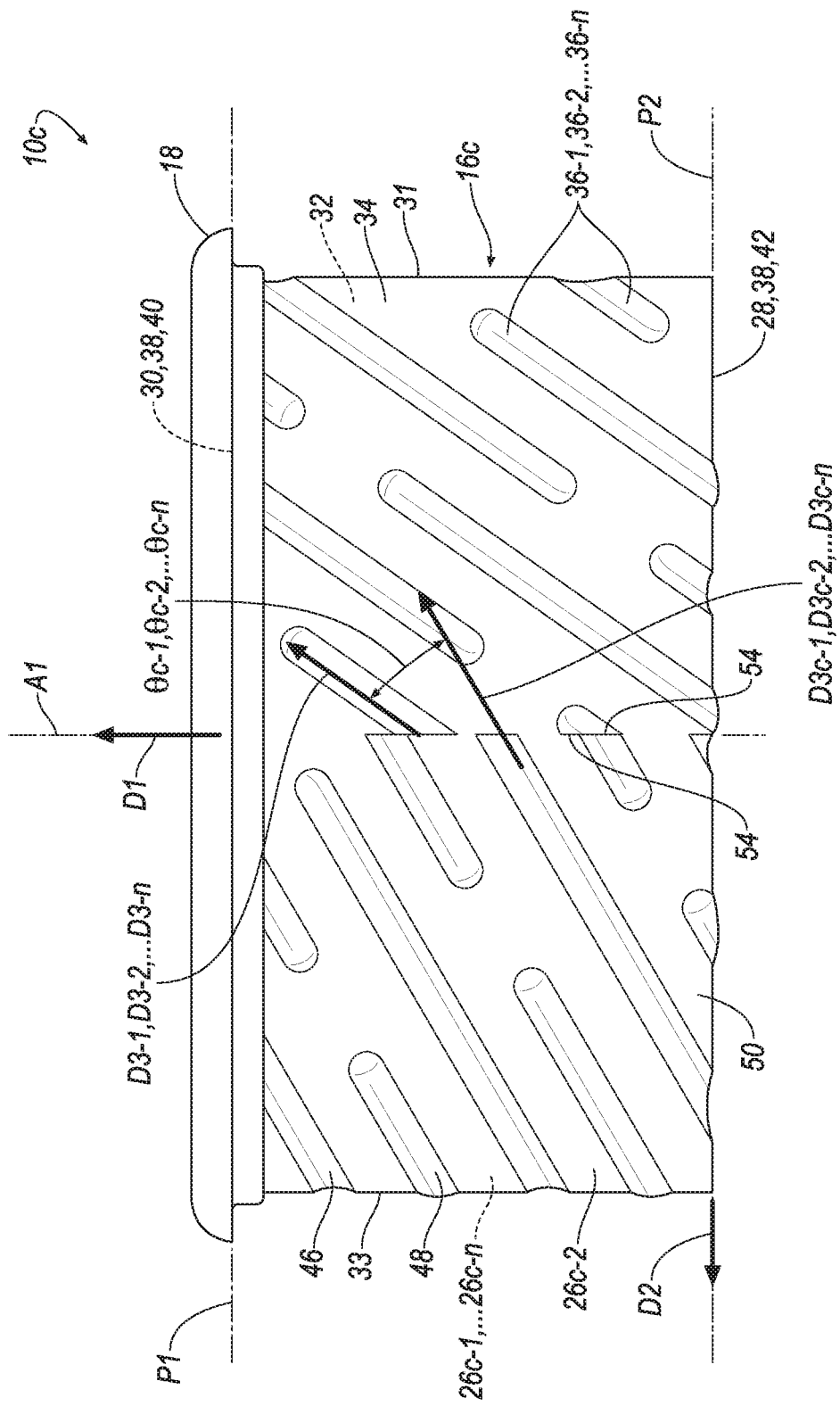
FIG. 7 is an end view of another filter element in accordance with the principles of the present disclosure.

With reference to FIG. 7, another filter element 10c is shown. The structure and function of the filter element 10c may be substantially similar to that of the filter elements 10, 10a, 10b, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The filter element 10c may include a pleated filter media 16c, the peripheral frame 18, and the screen 20 (not shown). The pleated filter media 16c may include a plurality of filter media panels 26c-1, 26c-2, . . . 26c-n. As with filter media panels 26-n illustrated in FIGS. 3A and 3B, each filter media panel 26c-n may include the inlet edge 28, the outlet edge 30, the first lateral edge 31, the second lateral edge 33, the clean side 32, the dirty side 34, and the plurality of embossments 36-1, 36-2, . . . 36-n.

As illustrated in FIG. 7, one or more of the embossments 36-1, 36-2, . . . 36-n (e.g., the protrusions 46 or the channels 48) may extend between the inlet edge 28 and the outlet edge 30 in one or more directions D3c-1, D3c-2, . . . D3c-n. One or more of the directions D3c-1, D3c-2, . . . D3b-n may be transverse to one or more of the directions D3-1, D3-2, . . . D3-n, such that one or more of the embossments 36-1, 36-2, . . . 36-n (e.g., one or more of the directions D3c-1, D3c-2, . . . D3c-n) defines an angle θc-1, θc-2, . . . θc-n relative to one or more of the other embossments 36-1, 36-2, . . . 36-n (e.g., one or more of the directions D3-1, D3-2, . . . D3-n).

The angle θc-1, θc-2, . . . θc-n may be greater than zero degrees and less than one hundred eighty degrees. In some implementations, the angle θc-1, θc-2, . . . θc-n is substantially (+/− three degrees) equal to forty-five degrees. In this regard, the directions D3c-1, D3c-2, . . . D3c-n may extend toward the outlet edge 30 or the central axis A1 from the second lateral edge 33 or the inlet edge 28, while the directions D3-1, D3-2, . . . D3-n may extend toward the outlet edge 30 or the first lateral edge 31 from the central axis A1 or the inlet edge 28. In particular, one or more of the embossments 36-1, 36-2, . . . 36-n may extend between the inlet edge 28, the outlet edge 30, the first lateral edge 31, and the central axis A1 of each filter media panel 26a-n, while another one or more of the embossments 36-1, 36-2, . . . 36-n may extend between the inlet edge 28, the outlet edge 30, the second lateral edge 33, and the central axis A1 of each filter media panel 26a-n, such that one or more of the embossments 36-1, 36-2, . . . 36-n includes the end 54 disposed along (e.g., aligned with or adjacent to) the central axis A1.

In some implementations, the end 54 of one or more of the embossments 36-1, 36-2, . . . 36-n extending between the inlet edge 28, the outlet edge 30, the first lateral edge 31, and the central axis A1 terminates at, or extends from (i) a portion of the gap 50 extending between the inlet edge 28, the outlet edge 30, the second lateral edge 33, and the central axis A1 or (ii) the end 54 of anther of the one or more embossments 36-1, 36-2, . . . 36-n extending between the inlet edge 28, the outlet edge 30, the second lateral edge 33, and the central axis A1. Similarly, the end 54 of one or more of the embossments 36-1, 36-2, . . . 36-n extending between the inlet edge 28, the outlet edge 30, the second lateral edge 33, and the central axis A1 may terminate at, or extend from, (i) another portion of the gap 50 extending between the inlet edge 28, the outlet edge 30, the first lateral edge 31, and the central axis A1 or (ii) the end 54 of anther of the one or more embossments 36-1, 36-2, . . . 36-n extending between the inlet edge 28, the outlet edge 30, the first lateral edge 31, and the central axis A1. In particular, a portion of each end 54 may be offset from a portion of another end 54 along the axis A1, while another portion of each end may be aligned with the portion of the other end 54 along the axis A1.

During use of the filter element 10c, fluid may flow in the direction D1 through the second plane P2 adjacent the dirty side 14 of the filter element 10c. As the fluid strikes the embossments 36-1, 36-2, . . . 36-n, (e.g., the protrusions 46), the embossments 36-1, 36-2, . . . 36-n, may redirect the flow of fluid in one of the directions D3-1, D3-2, . . . D3-n and D3c-1, D3c-2, . . . D3c-n and through and along the gaps 50 between the embossments 36-1, 36-2, . . . 36-n. In this regard, the portion of fluid entering the clean side 12 between the second lateral edge 33 and the central axis A1 may be directed by one or more of the embossments 36-1, 36-2, . . . 36-n toward the central axis A1, while the portion of fluid entering the clean side 12 between the first lateral edge 31 and the central axis A1 may be directed by another one or more of the embossments 36-1, 36-2, . . . 36-n toward the first lateral edge 31, as the fluid flows toward the first plane P1 adjacent the clean side 12 of the filter element 10c, thus allowing dust and other particulate matter to be directed into various regions of the filter element 10c.

Figure 8:
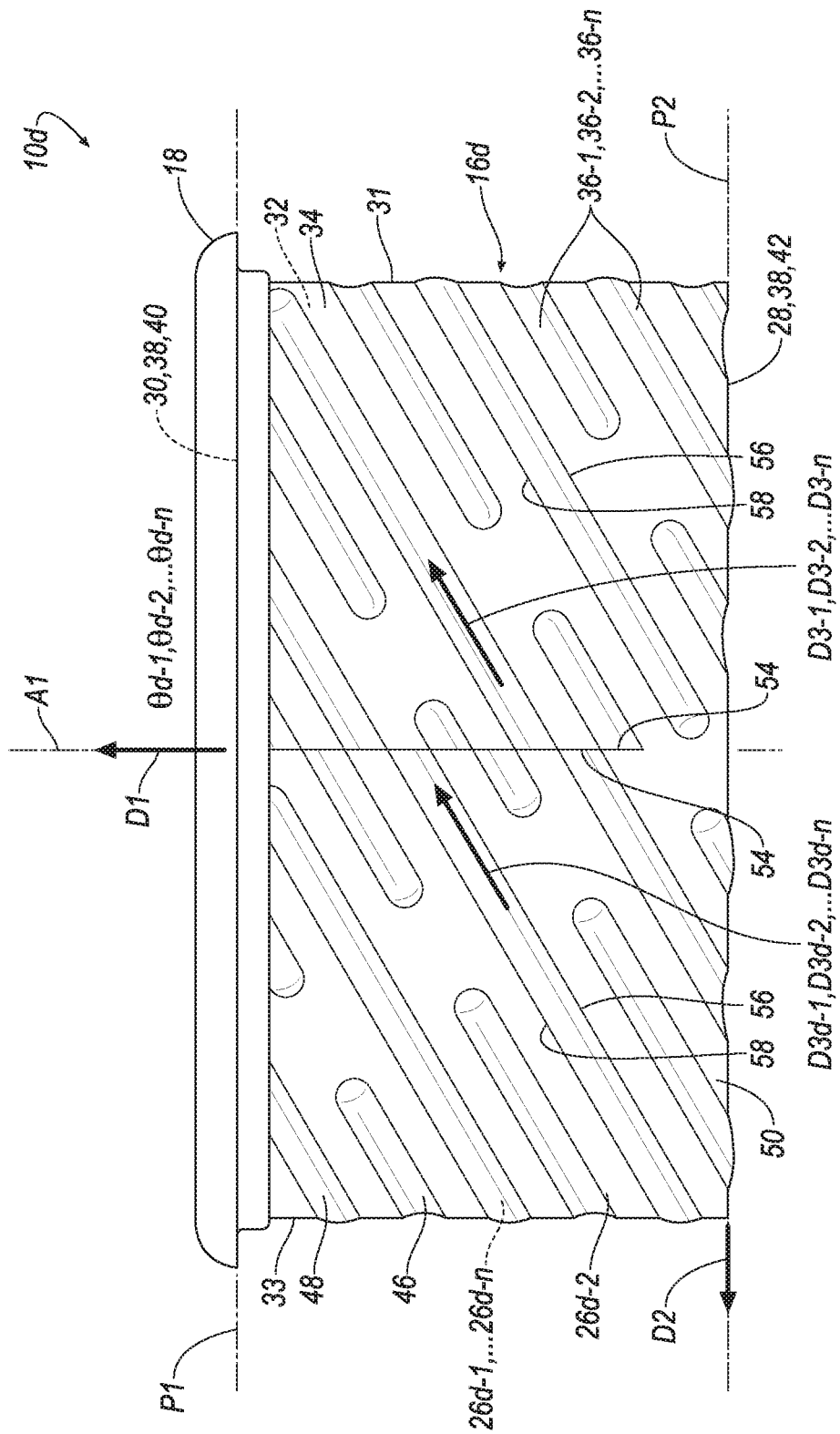
FIG. 8 is an end view of another filter element in accordance with the principles of the present disclosure.

With reference to FIG. 8, another filter element 10d is shown. The structure and function of the filter element 10d may be substantially similar to that of the filter element 10, 10a, 10b, 10c, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "d") are used to identify those features that have been modified.

The filter element 10d may include a pleated filter media 16d, the peripheral frame 18, and the screen 20 (not shown). The pleated filter media 16d may include a plurality of filter media panels 26d-1, 26d-2, . . . 26d-n. As with filter media panels 26-n illustrated in FIGS. 3A and 3B, each filter media panel 26d-n may include the inlet edge 28, the outlet edge 30, the first lateral edge 31, the second lateral edge 33, the clean side 32, the dirty side 34, and the plurality of embossments 36-1, 36-2, . . . 36-n.

As illustrated in FIG. 8, one or more of the embossments 36-1, 36-2, . . . 36-n (e.g., the protrusions 46 or the channels 48) may extend between the inlet edge 28 and the outlet edge 30 in one or more directions D3d-1, D3d-2, . . . D3d-n. One or more of the directions D3d-1, D3d-2, . . . D3d-n may be parallel to one or more of the directions D3-1, D3-2, . . . D3-n.

In some implementations, the end 54 of one or more of the embossments 36-1, 36-2, . . . 36-n extending between the inlet edge 28, the outlet edge 30, the first lateral edge 31, and the central axis A1 terminates at, or extends from a portion of the gap 50 extending between the inlet edge 28, the outlet edge 30, the second lateral edge 33, and the central axis A1, while the end 54 of one or more of the embossments 36-1, 36-2, . . . 36-n extending between the inlet edge 28, the outlet edge 30, the second lateral edge 33, and the central axis A1 terminates at, or extends from another portion of the gap 50 extending between the inlet edge 28, the outlet edge 30, the first lateral edge 31, and the central axis A1. In particular each end 54 may be offset from the remaining ends 54 along the axis A1 (e.g., in the direction D1). In particular, each end 54 may be offset from another end 54 by a distance substantially equal to a width (measured in the direction D1) of the embossment 36-1, 36-2, . . . 36-n, such that an inlet edge 56 of an embossment 36-1, 36-2, . . . 36-n extending between the inlet edge 28, the outlet edge 30, the first lateral edge 31, and the central axis A1 is aligned (e.g., collinear) with an outlet edge 58 of an embossment 36-1, 36-2, . . . 36-n extending between the inlet edge 28, the outlet edge 30, the second lateral edge 33, and the central axis A1, while an inlet edge 56 of an embossment 36-1, 36-2, . . . 36-n extending between the inlet edge 28, the outlet edge 30, the second lateral edge 33, and the central axis A1 is aligned (e.g., collinear) with an outlet edge 58 of an embossment 36-1, 36-2, . . . 36-n extending between the inlet edge 28, the outlet edge 30, the first lateral edge 31, and the central axis. In some implementations, an inlet edge 56 of an embossment 36-1, 36-2, . . . 36-n extending between the inlet edge 28, the outlet edge 30, the first lateral edge 31, and the central axis A1 may be disposed between an inlet edge 56 and an outlet edge 58 of an embossment 36-1, 36-2, . . . 36-n extending between the inlet edge 28, the outlet edge 30, the second lateral edge 33, and the central axis A1, such that a portion of the embossment 36-1, 36-2, . . . 36-n extending between the inlet edge 28, the outlet edge 30, the first lateral edge 31, and the central axis A1 overlaps a portion of the embossment 36-1, 36-2, . . . 36-n extending between the inlet edge 28, the outlet edge 30, the second lateral edge 33, and the central axis A1.

During use of the filter element 10d, fluid may flow in the direction D1 through the second plane P2 adjacent the dirty side 14 of the filter element 10d. As the fluid strikes the embossments 36-1, 36-2, . . . 36-n (e.g., the protrusions 46), the embossments 36-1, 36-2, . . . 36-n may redirect the flow of fluid in one or more of the directions D3-1, D3-2, . . . D3-n and D3d-1, D3d-2, . . . D3d-n and through and along the gaps 50 between the embossments 36-1, 36-2, . . . 36-n. In this regard, the embossments 36-1, 36-2, . . . 36-n may direct the flow of fluid toward the first lateral edge 31 and toward the first plane P1 adjacent the clean side 12 of the filter element 10d, allowing dust and other particulate matter to be collected proximate the first lateral edge 31.

Figure 9:
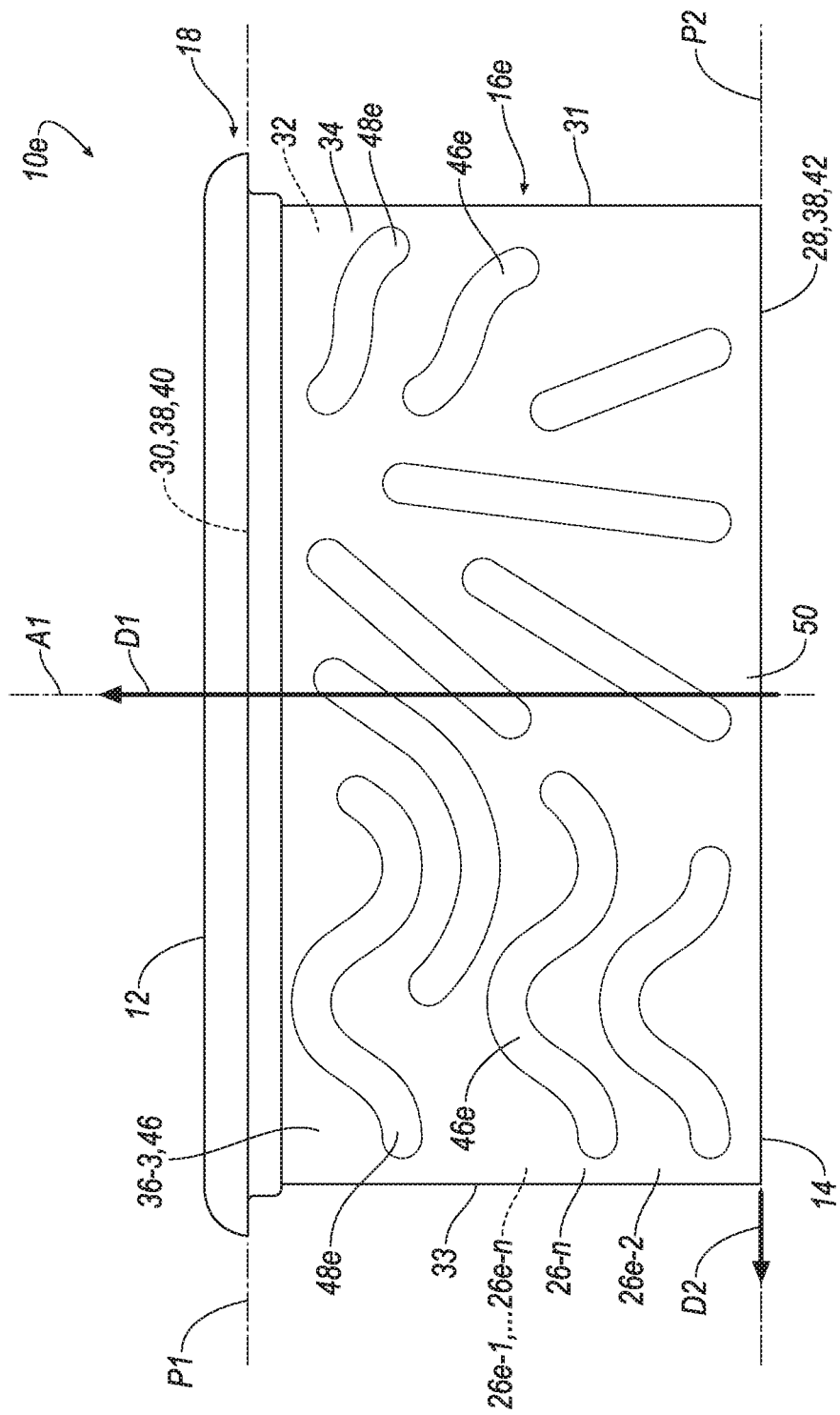
FIG. 9 is an end view of another filter element in accordance with the principles of the present disclosure.

With reference to FIG. 9, another filter element 10e is shown. The structure and function of the filter element 10e may be substantially similar to that of the filter element 10, 10a, 10b, 10c, 10d apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "e") are used to identify those features that have been modified.

The filter element 10e may include a pleated filter media 16e, the peripheral frame 18, and the screen 20 (not shown). The pleated filter media 16e may include a plurality of filter media panels 26e-1, 26e-2, . . . 26e-n. As with filter media panels 26-n illustrated in FIGS. 3A and 3B, each filter media panel 26e-n may include the inlet edge 28, the outlet edge 30, the first lateral edge 31, the second lateral edge 33, the clean side 32, the dirty side 34, and a plurality of protrusions 46e and/or channels 48e.

As illustrated in FIG. 9, one or more of the protrusions 46e and/or channels 48e may extend between the first lateral edge 31 and the second lateral edge 33 in a sinusoidal direction, while others of the protrusions 46e and/or channels 48e may extend between the first lateral edge 31 and the second lateral edge 33 in a linear direction, such that the protrusions 46e and/or channels 48e can direct the flow of fluid to a target location along the outlet edge 30. In this regard, one or more of the protrusions 46e and/or channels 48e may be parallel to one or more of the other protrusions 46e and/or channels 48e, while another one or more of the protrusions 46e and/or channels 48e may extend in a direction oblique to a direction of one or more other protrusions 46e and/or channels 48e.

Figure 10:
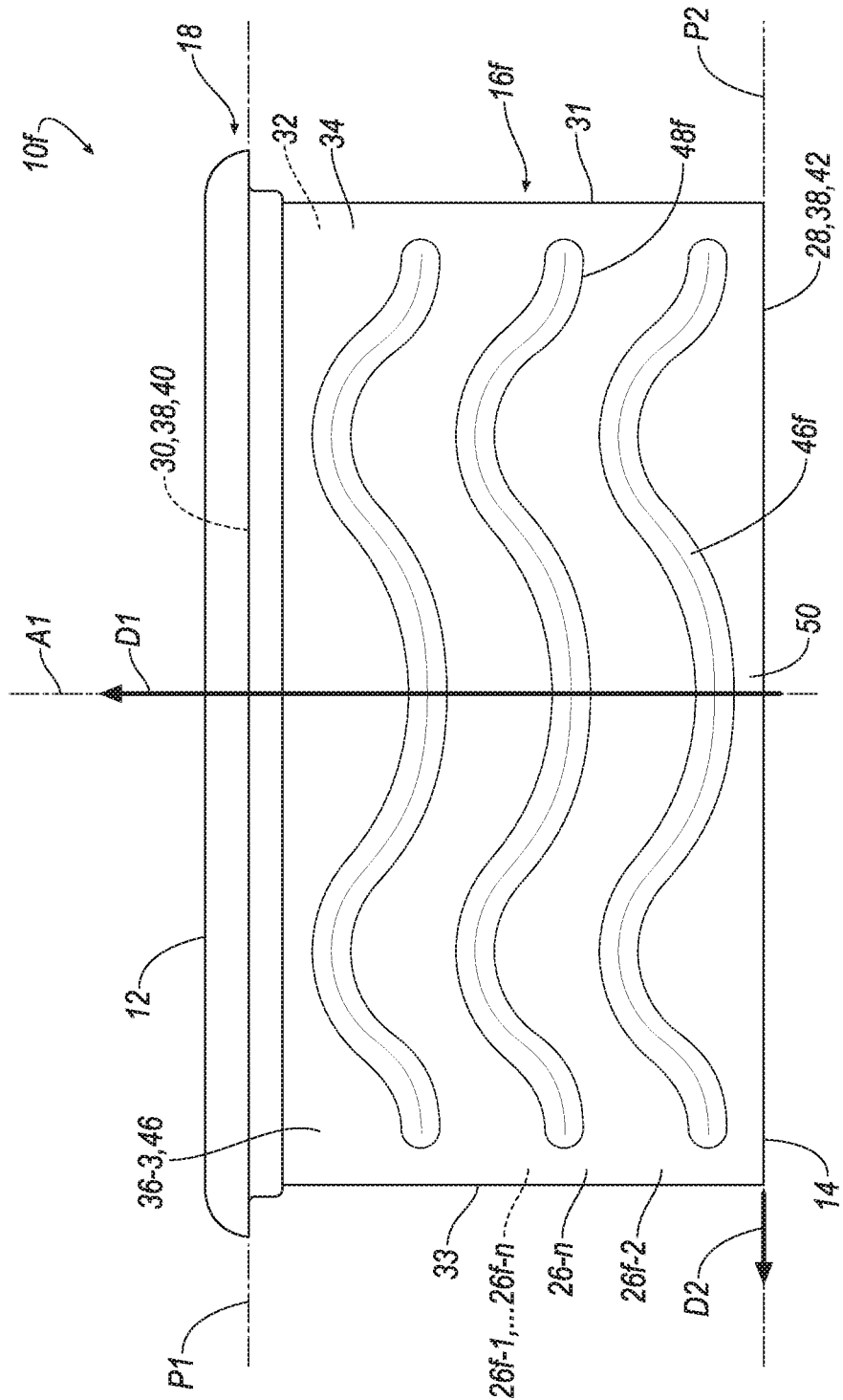
FIG. 10 is an end view of another filter element in accordance with the principles of the present disclosure.

With reference to FIG. 10, another filter element 10f is shown. The structure and function of the filter element 10f may be substantially similar to that of the filter element 10, 10a, 10b, 10c, 10d, 10e apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "f") are used to identify those features that have been modified.

The filter element 10f may include a pleated filter media 16f, the peripheral frame 18, and the screen 20 (not shown). The pleated filter media 16f may include a plurality of filter media panels 26f-1, 26f-2, . . . 26f-n. As with filter media panels 26-n illustrated in FIGS. 3A and 3B, each filter media panel 26f-n may include the inlet edge 28, the outlet edge 30, the first lateral edge 31, the second lateral edge 33, the clean side 32, the dirty side 34, and a plurality of protrusions 46f and/or channels 48f.

As illustrated in FIG. 10, one or more of the protrusions 46f and/or channels 48f may extend between the first lateral edge 31 and the second lateral edge 33 in a sinusoidal direction. In this regard, one or more of the protrusions 46f and/or channels 48f may be parallel to one or more of the other protrusions 46f and/or channels 48f.

Figure 11:
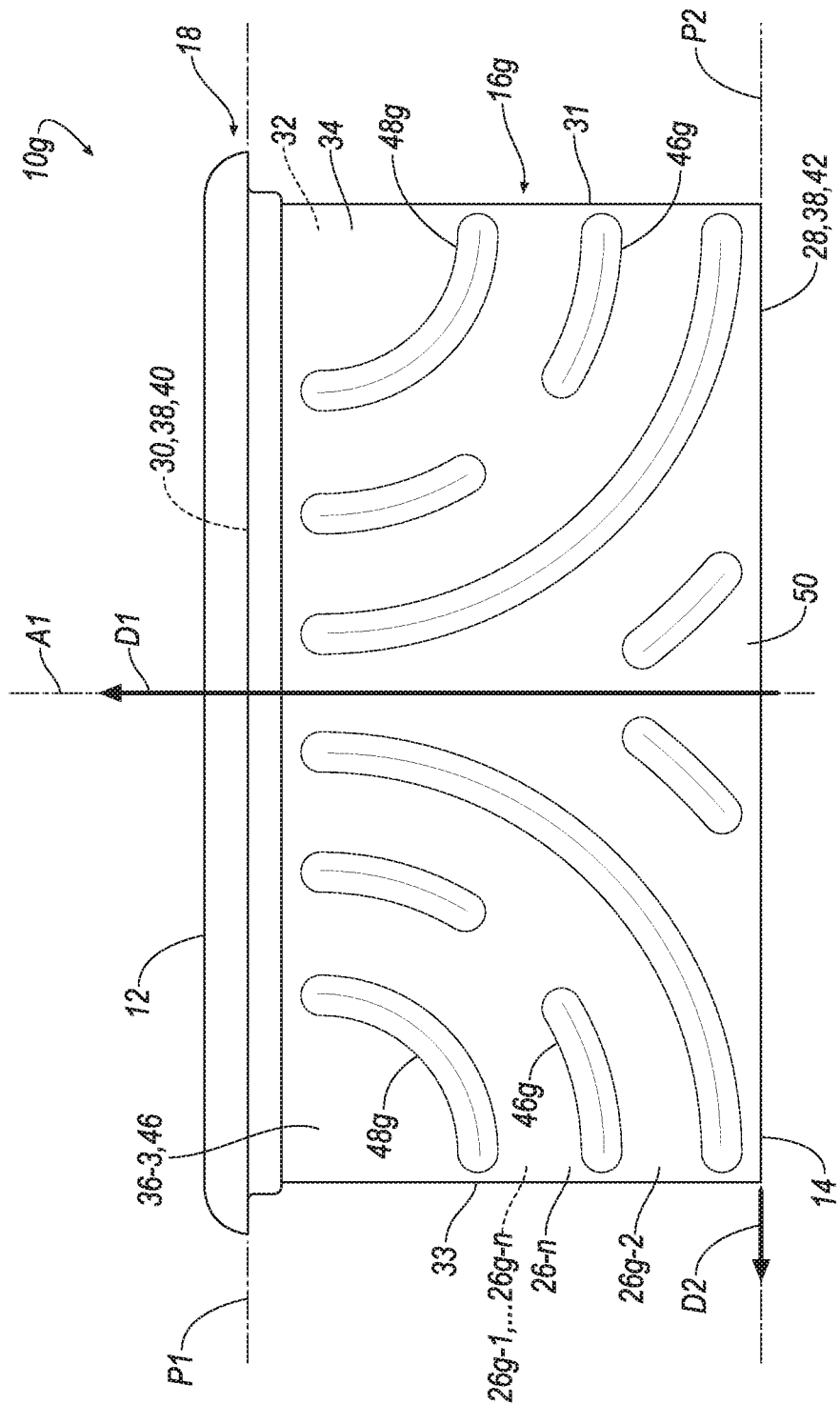
FIG. 11 is an end view of another filter element in accordance with the principles of the present disclosure.

With reference to FIG. 11, another filter element 10g is shown. The structure and function of the filter element 10g may be substantially similar to that of the filter element 10, 10a, 10b, 10c, 10d, 10e, 10f apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "g") are used to identify those features that have been modified.

The filter element 10g may include a pleated filter media 16g, the peripheral frame 18, and the screen 20 (not shown). The pleated filter media 16g may include a plurality of filter media panels 26g-1, 26g-2, . . . 26g-n. As with filter media panels 26-*n* illustrated in FIGS. 3A and 3B, each filter media panel 26*g*-*n* may include the inlet edge 28, the outlet edge 30, the first lateral edge 31, the second lateral edge 33, the clean side 32, the dirty side 34, and a plurality of protrusions 46*g* and/or channels 48*g*.

As illustrated in FIG. 11, one or more of the protrusions 46*g* and/or channels 48*g* may extend between the first lateral edge 31 and the second lateral edge 33 in an arcuate direction, such that the protrusions 46*g* and/or channels 48*g* can direct the flow of fluid to a target location along the outlet edge 30. In this regard, one or more of the protrusions 46*g* and/or channels 48*g* may be parallel to one or more of the other protrusions 46*g* and/or channels 48*g*, while another one or more of the protrusions 46*g* and/or channels 48*g* may extend in a direction oblique to a direction of one or more other protrusions 46*g* and/or channels 48*g*. In particular, as illustrated, a first plurality of the protrusions 46*g* and/or channels 48*g* may include a concave profile facing one or both of the outlet edge 30 and the second lateral edge 33, while a second plurality of the protrusions 46*g* and/or channels 48*g* may include a concave profile facing one or both of the outlet edge 30 and the first lateral edge 31, such that a convex profile of the first plurality of the protrusions 46*g* and/or channels 48*g* faces a convex profile of the second plurality of the protrusions 46*g* and/or channels 48*g*.

Figure 12:
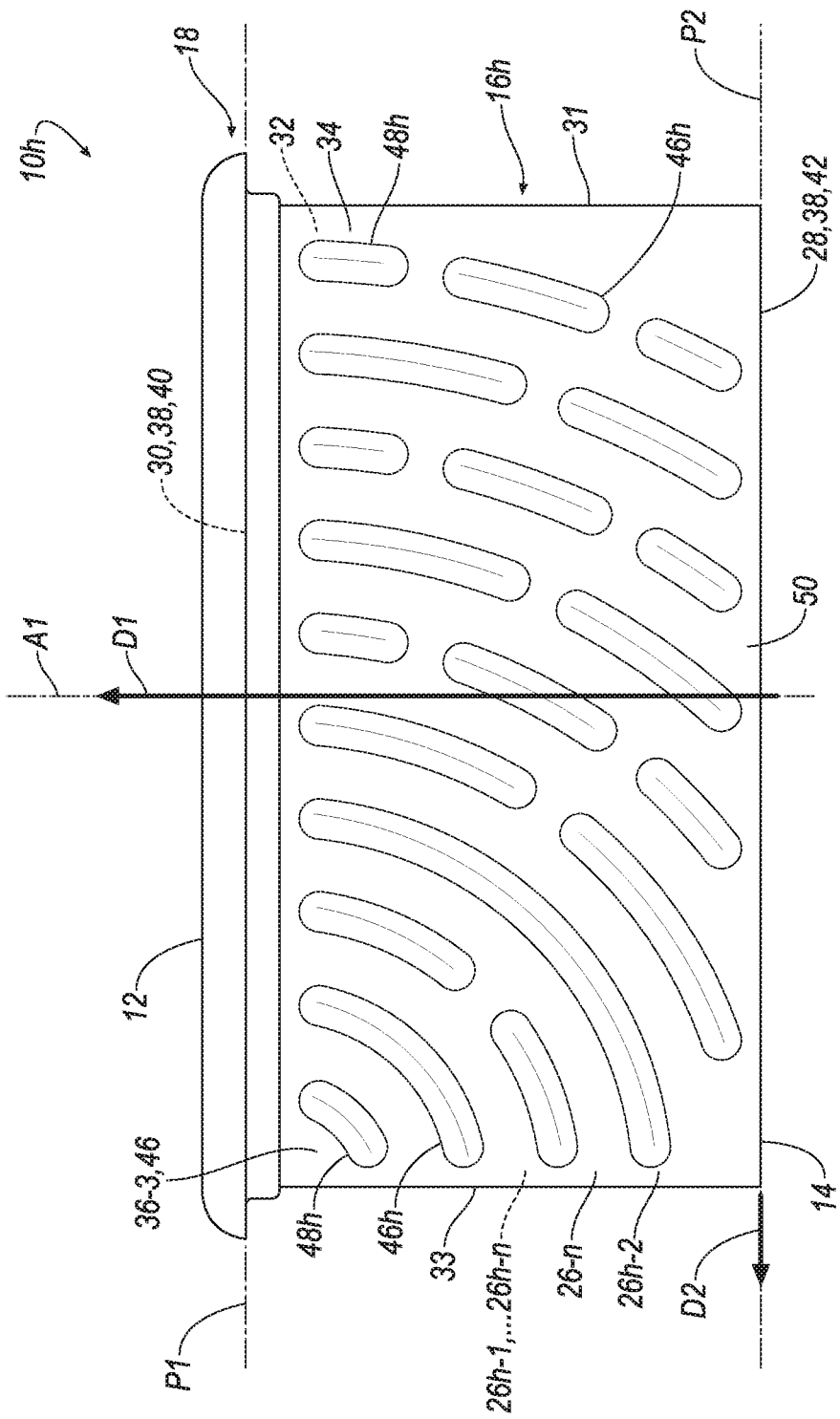
FIG. 12 is an end view of another filter element in accordance with the principles of the present disclosure.

With reference to FIG. 12, another filter element 10*h* is shown. The structure and function of the filter element 10*h* may be substantially similar to that of the filter element 10, 10*a*, 10*b*, 10*c*, 10*d*, 10*e*, 10*f*, 10*g* apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "h") are used to identify those features that have been modified.

The filter element 10*h* may include a pleated filter media 16*h*, the peripheral frame 18, and the screen 20 (not shown). The pleated filter media 16*h* may include a plurality of filter media panels 26*h*-1, 26*h*-2, . . . 26*h*-*n*. As with filter media panels 26-*n* illustrated in FIGS. 3A and 3B, each filter media panel 26*h*-*n* may include the inlet edge 28, the outlet edge 30, the first lateral edge 31, the second lateral edge 33, the clean side 32, the dirty side 34, and a plurality of protrusions 46*h* and/or channels 48*h*.

As illustrated in FIG. 12, one or more of the protrusions 46*h* and/or channels 48*h* may extend between the first lateral edge 31 and the second lateral edge 33 in an arcuate direction, such that the protrusions 46*h* and/or channels 48*h* can direct the flow of fluid to a target location along the outlet edge 30. In this regard, one or more of the protrusions 46*h* and/or channels 48*h* may be parallel to one or more of the other protrusions 46*h* and/or channels 48*h*. In particular, as illustrated, the protrusions 46*h* and/or channels 48*h* may include a concave profile facing one or both of the outlet edge 30 and the second lateral edge 33, such that a convex profile of the protrusions 46*g* and/or channels 48*g* faces the inlet edge 28 and the first lateral edge 31.

Figure 13:
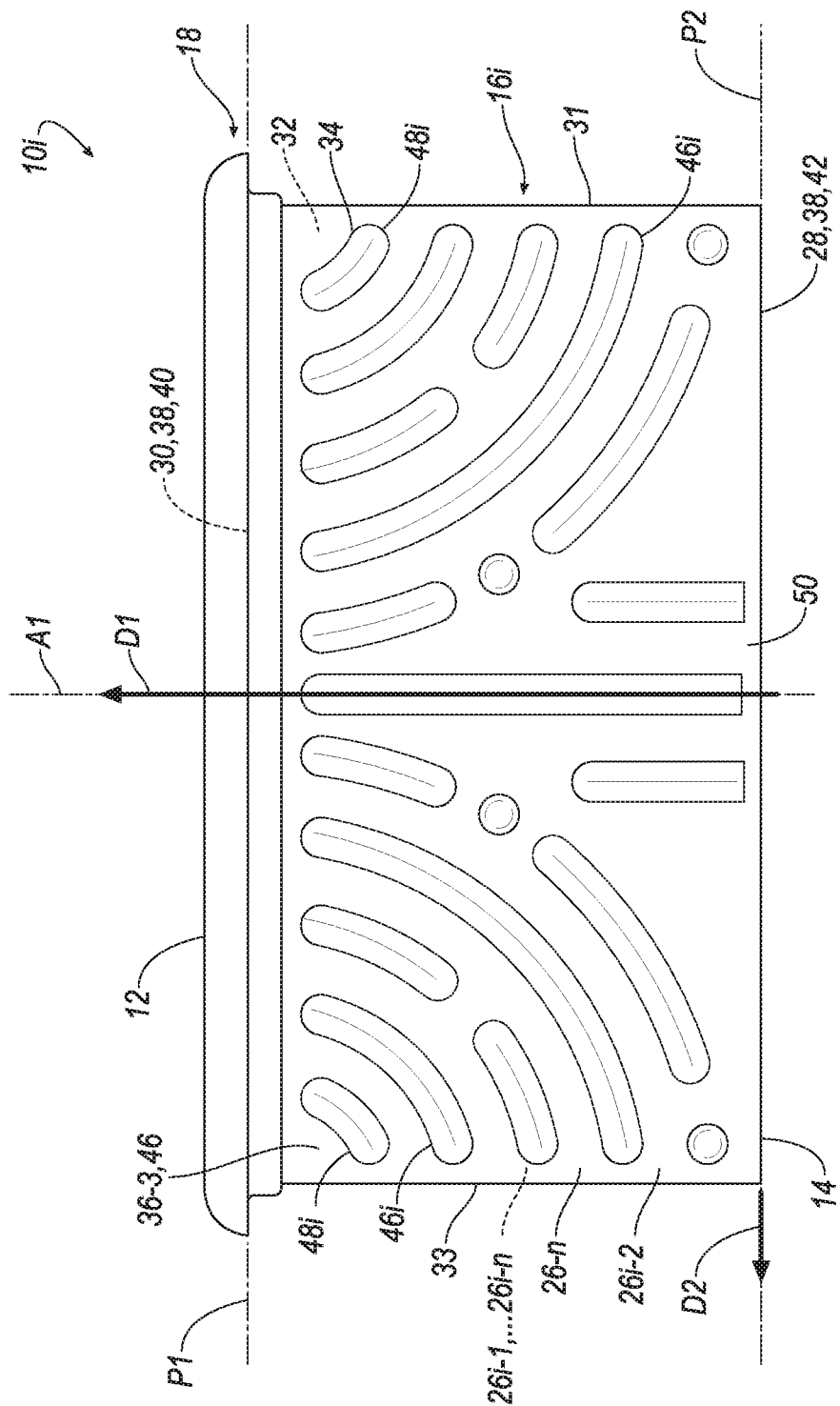
FIG. 13 is an end view of another filter element in accordance with the principles of the present disclosure.

With reference to FIG. 13, another filter element 10*i* is shown. The structure and function of the filter element 10*i* may be substantially similar to that of the filter element 10, 10*a*, 10*b*, 10*c*, 10*d*, 10*e*, 10*f*, 10*g*, 10*h* apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "i") are used to identify those features that have been modified.

The filter element 10*i* may include a pleated filter media 16*i*, the peripheral frame 18, and the screen 20 (not shown). The pleated filter media 16*i* may include a plurality of filter media panels 26*i*-1, 26*i*-2, . . . 26*i*-*n*. As with filter media panels 26-*n* illustrated in FIGS. 3A and 3B, each filter media panel 26*i*-*n* may include the inlet edge 28, the outlet edge 30, the first lateral edge 31, the second lateral edge 33, the clean side 32, the dirty side 34, and a plurality of protrusions 46*i* and/or channels 48*i*.

As illustrated in FIG. 13, one or more of the protrusions 46*i* and/or channels 48*i* may extend between the first lateral edge 31 and the second lateral edge 33 in an arcuate direction, while others of the protrusions 46*i* and/or channels 48*i* may extend between the first lateral edge 31 and the second lateral edge 33 in a linear direction, such that the protrusions 46*i* and/or channels 48*i* can direct the flow of fluid to a target location along the outlet edge 30. In this regard, one or more of the protrusions 46*i* and/or channels 48*i* may be parallel to one or more of the other protrusions 46*i* and/or channels 48*i*, while another one or more of the protrusions 46*i* and/or channels 48*i* may extend in a direction oblique to a direction of one or more other protrusions 46*i* and/or channels 48*i*. In particular, as illustrated, a first plurality of the protrusions 46*i* and/or channels 48*i* may include a concave profile facing one or both of the outlet edge 30 and the second lateral edge 33, while a second plurality of the protrusions 46*i* and/or channels 48*i* may extend linearly toward the outlet edge 30 and/or the first lateral edge 31, such that a convex profile of the first plurality of the protrusions 46*i* and/or channels 48*i* faces a linear profile of the second plurality of the protrusions 46*i* and/or channels 48*i*. In some implementations, one or more of the second plurality of protrusions 46*i* and/or channels 48*i* extends in a direction substantially parallel to the axis A1.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A pleated filter media comprising:
   a first filter media panel having a first clean side and a first dirty side opposite the first clean side;
   a second filter media panel coupled to the first filter media panel at a first pleat extending in a first direction transverse to a central axis of the pleated filter media, the central axis extending in a second direction, the second filter media panel having a second clean side and a second dirty side opposite the second clean side, the first dirty side facing the second dirty side;
   a first plurality of embossments, each embossment of the first plurality of embossments disposed on the first filter media panel and the second filter media panel and along the first pleat, the first plurality of embossments extending in a third direction transverse to the first direction and the second direction and including:
     a first embossment extending between and including a first protruding portion on the first dirty side and a second protruding portion on the second dirty side, the first protruding portion aligned with and engaging the second protruding portion; and
     a second embossment extending between and including a first recessed portion on the first dirty side and a second recessed portion on the second dirty side, the first recessed portion aligned with and spaced away from the second recessed portion; and
   a second plurality of embossments, each embossment of the second plurality of embossments disposed on at least one selected from the group consisting of the first filter media panel and the second filter media panel, the second plurality of embossments including:
     a third embossment including a third protruding portion on the second dirty side; and
     a fourth embossment including a third recessed portion on the second dirty side.

2. The pleated filter media of claim 1, wherein the first embossment is disposed at a first angle relative to the first direction, the first angle being greater than zero degrees and less than ninety degrees.

3. The pleated filter media of claim 2, wherein the first angle is substantially equal to forty-five degrees.

4. The pleated filter media of claim 2, wherein each of the second plurality of embossments is disposed at a second angle relative to the first direction, the second angle being different than the first angle.

5. The pleated filter media of claim 4, wherein the second plurality of embossments includes a fifth embossment disposed on the first filter media panel and the second filter media panel.

6. The pleated filter media of claim 2, wherein the second plurality of embossments includes a fifth embossment disposed on at least one of the first filter media panel or the second filter media panel at a second angle relative to the first direction, wherein the first embossment terminates at a first axis, and the fifth embossment is offset from the first embossment and terminates at the first axis.

7. The pleated filter media of claim 6, wherein the second angle is equal to the first angle.

8. The pleated filter media of claim 1, wherein the second embossment includes a fourth protruding portion on the first clean side and a fifth protruding portion on the second clean side.

9. The pleated filter media of claim 8, wherein the fourth protruding portion is parallel to the fifth protruding portion.

10. The pleated filter media of claim 1, wherein the first plurality of embossments includes a fifth embossment that includes a fourth protruding portion on the first dirty side and a fifth protruding portion on the second dirty side.

11. The pleated filter media of claim 10, wherein the fourth protruding portion engages the fifth protruding portion.

12. The pleated filter media of claim 11, wherein the fourth protruding portion is parallel to the fifth protruding portion.

13. A pleated filter media comprising:
    a first filter media panel having a first clean side and a first dirty side opposite the first clean side; and
    a second filter media panel coupled to the first filter media panel at a first pleat and having a second clean side and a second dirty side opposite the second clean side;
    wherein the first filter media panel and the second filter media panel include a first plurality of embossments extending in a first direction transverse to a central axis of the pleated filter media, the central axis extending in a second direction, the first plurality of embossments disposed on the first filter media panel and the second filter media panel and along the first pleat and including:
      a first embossment extending between and including a first protruding portion on the first dirty side and a second protruding portion on the second dirty side; and
      a second embossment extending between and including a first recessed portion on the first dirty side and a second recessed portion on the second dirty side; and
    wherein the second filter media panel includes a second plurality of embossments extending from the first pleat in a third direction transverse to the second direction, the second plurality of embossments including:
      a third embossment including a third protruding portion on the second dirty side; and
      a fourth embossment including a third recessed portion on the second dirty side, the first protruding portion aligned with and engaging the third protruding portion and the first recessed portion aligned with and spaced away from the third recessed portion.

14. The pleated filter media of claim 13, wherein the first pleat extends in the first direction, and wherein each of the first plurality of embossments is disposed at a first angle relative to the first direction, and each of the second plurality of embossments is disposed at a second angle relative to the first direction, the first and second angles each being greater than zero degrees and less than ninety degrees.

15. The pleated filter media of claim 14, wherein the first angle equals the second angle.

16. The pleated filter media of claim 14, further comprising a fifth embossment disposed on at least one of the first filter media panel or the second filter media panel, wherein the fifth embossment is disposed at a third angle relative to the second direction, the third angle being different than the first angle.

17. The pleated filter media of claim 14, further comprising a fifth embossment disposed on at least one of the first filter media panel or the second filter media panel at a third angle relative to the first direction, wherein the fifth embossment terminates at a first axis, and the second embossment is offset from the first embossment and terminates at the first axis.

18. The pleated filter media of claim 17, wherein the third angle is equal to the first angle.

19. The pleated filter media of claim 13, wherein the first plurality of embossments includes a fifth embossment that includes a fourth protruding portion on the first dirty side and a fifth protruding portion on the second dirty side.

20. The pleated filter media of claim 19, wherein the fourth protruding portion engages the fifth protruding portion.

21. The pleated filter media of claim 20, wherein the fourth protruding portion is parallel to the fifth protruding portion.

* * * * *